Nov. 7, 1933.  W. ELLIOTT  1,934,490
COMBINATION SEED SCATTERING AND SHOVEL BACK DEVICE
Filed April 23, 1930
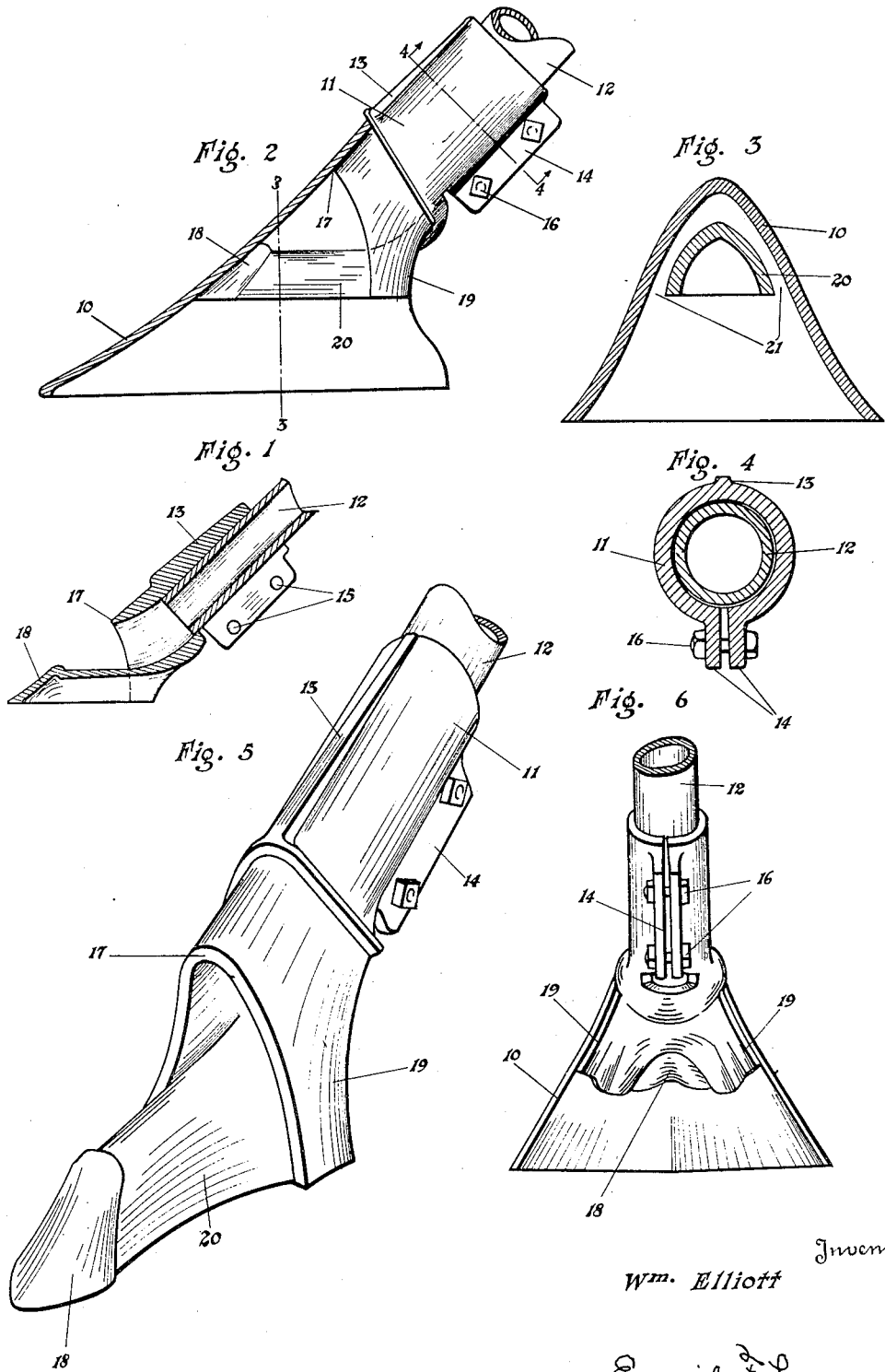
Inventor
Wm. Elliott
By Emil F. Lange
Attorney Patented Nov. 7, 1933

1,934,490

UNITED STATES PATENT OFFICE 1,934,490

COMBINATION SEED SCATTERING AND SHOVEL BACK DEVICE

William Elliott, Beatrice, Nebr., assignor to Dempster Mill Manufacturing Company, a corporation of Nebraska Application April 23, 1930. Serial No. 446,624

6 Claims. (Cl. 111—86)

My invention relates to a combination seed-scattering and shovel back device for the purpose of depositing seed in the furrow formed by the furrow opener. The primary object of the invention is the provision of a shovel back designed for the purpose of scattering and distributing the seed throughout the width of the furrow formed by the furrow opener.

Another of my objects is the provision of a shovel back which may be attached to any kind of furrow opener such as is used to open a furrow and to prepare a seed bed for small grains.

A further object of the invention is the provision of a shovel back which may be easily attached to or detached from the standard of the implement when it is necessary to sharpen the furrow opener or to change from one size to another.

Having in view these objects and others to which reference is made in the following description, I will now refer to the drawing, in which Figure 1 is a median vertical sectional view of the shovel back in its relation to a seed tube, the shovel or furrow opener being omitted.

Figure 2 is a view in side elevation of the shovel back and of a portion of the seed tube, the shovel or furrow opener being shown in section.

Figure 3 is a sectional view taken on the line 3—3 of Figure 2.

Figure 4 is a sectional view taken on the line 4—4 of Figure 2 looking in the direction of the arrows.

Figure 5 is a view in perspective of the shovel back attached to the end of the seed tube.

Figure 6 is a view in rear elevation of the lower portion of the shovel back and of the seed tube.

The shovel or furrow opener 10 is the usual lister type furrow opener which cuts a gash in the surface soil and which deposits the soil in ridges at both sides of the furrow opener. In the present instance the furrow opener 10 is so shaped and dimensioned that it will crumble the moist soil taken from the bottom of the furrow and so that it will deposit much of the crumbled moist soil in the furrow in the rear of the furrow opener. The seed is deposited in the bottom of the furrow and is covered by the moist soil which is pressed down by means of presser wheels which constitute part of the implement. Since the presser wheels are old and well-known in the art it is deemed unnecessary to show and describe them specifically.

The shovel back has a collar 11 at its upper extremity for engaging the seed tube 12. This collar has a strengthening rib 13 and a pair of ears 14 diametrically opposite the rib 13. The collar is split as shown in Figure 4 and the two ears 14 are parallel to each other adjacent the ends at the split portion. The ears are provided with apertures 15 for the reception of bolts 16 through which the collar 11 may be tightly clamped about the seed tube 12. The shovel back is integral in construction and the portion underneath the collar 11 is flared out in fan-shape to conform to the shape of the under side of the furrow opener 10. The collar 11 is reduced at its outlet extremity where it directly engages the furrow opener 10 so as to provide a smooth and continuous surface at the exposed joints between the shovel back and the furrow opener. This construction is best shown in Figure 2 and its purpose is to prevent the entrance of dust and moisture into the joints.

The seed feeding channel of the shovel back is continuous with that of the seed tube 12 but this channel changes its direction to the horizontal as shown in Figures 1, 2 and 5. The channel from the seed tube is continued in arcuate form as shown in Figure 1, the purpose being to alter the direction of flow of the seed in such a way as to provide for the maximum scattering of the seed. The seed passing out through the mouth of the conduit or channel is hurled against the upper surface of the bottom of the shovel back and also against the under surface of the shovel or furrow opener. It should be noted that small grains such as wheat, oats, barley, and the like will not pass through the seed tube in a fine stream but they will be scattered throughout their passage through the seed tube. For my purpose it is important that the seed be not only maintained in a scattered condition but that it also be further scattered before it reaches the outlet in its passage through the shovel back.

The upper surface of the bottom of the shovel back is straight from front to rear as shown in Figures 1 and 2. This surface is ridged as shown and the shovel back is provided with a front portion which seats tightly against the under surface of the furrow opener 10. It should be noted that the shovel back is firmly secured to the furrow opener by riveting or by welding or in any other suitable manner. It is desirable, however, that all joints be as tight as possible in order to prevent injury due to the constant hammering of the stream of grain and also from the moisture which is apt to collect in loose joints in all soil-working implements. The ridge 18 with the front wall of the furrow back in tight contact with the under surface of the furrow opener 10 is formed largely with the object of making the joint tight. Another object of this ridge 18 is to deflect and to guide the movement of the seed immediately before the seed is discharged into the furrow. The portion 19 of the shovel back is also formed for tight connection with the furrow opener 10, as best shown in Figure 6. The bottom wall 20 of the shovel back is curved as shown in Figures 3 and 5 and it is spaced from the sides of the furrow opener throughout the distance between the ridge 18 and the portion 19. This provides for two apertures 21 underneath the furrow opener 10, these apertures being relatively narrow as shown in Figure 3 and relatively long as shown in Figure 2.

In its passage through the field the shovel cuts a shallow lister furrow and leaves a plow sole in the moist ground at the bottom of the furrow. It is on this plow sole that the seed is dropped in scattered condition throughout the entire width of the furrow. The seed is dropped while the furrow with its plow sole are being formed and the seed is immediately covered up by the crumbly moist soil which drops back into the furrow immediately after the shovel has passed on, the soil being then pressed down by a presser wheel following the shovel. The ground is not allowed to dry out but the prime advantage is the broadcasting of the seed throughout the entire width of the furrow.

When it is desired to sharpen the shovel, the shovel with its shovel back may be readily removed by releasing the bolts 16. It is sometimes advantageous to provide the same implement with interchangeable shovels of various widths. The releasable connection of the combined shovel and shovel back with the seed tube facilitates the ready interchangeability of shovels without the necessity of employing a different implement whenever a change in the width of the furrow becomes necessary or desirable.

Having thus described my invention in such full, clear, and exact terms that its construction and operation will be readily understood by others skilled in the art to which it pertains, what I claim as new and desire to secure by Letters Patent of the United States is:

1. A shovel back adapted for attachment to a shovel or furrow opener of the lister type, said shovel back having a forwardly and downwardly inclined seed conduit terminating at the apex of the rear surface of the shovel or furrow opener, downwardly and laterally inclined elongated discharge passageways adjacent the rear surfaces of the shovel or furrow opener for receiving the seed from said conduit and for discharging it in scattered condition in the newly formed furrow, and means for clamping said shovel back to a seed tube of a seeding implement.

2. A shovel back adapted for attachment to a shovel or furrow opener of the lister type, said shovel back having a seed conduit inclined first downwardly and forwardly and then horizontally and forwardly and terminating at the apex of the rear surface of the shovel or furrow opener, the lower side walls of said shovel back being downwardly, laterally and forwardly inclined and spaced from the rear walls of the shovel or furrow opener in substantial parallelism therewith to provide a pair of rearwardly diverging elongated discharge passageways communicating with said seed conduit for discharging the seed in scattered condition in the newly formed furrow, and means for clamping said shovel back to a seed tube of a seed implement.

3. A shovel back adapted for attachment to a shovel or furrow opener of the lister type, said shovel back having a seed conduit with a floor inclined first downwardly and forwardly and then horizontally and forwardly and terminating at the apex of the rear surface of the shovel or furrow opener, the floor of said conduit being convex in its lower portion in spaced parallelism with the side walls of the shovel or furrow opener to provide narrow but elongated outlets for discharging the seed in scattered condition in the newly formed furrow, a rear wall for said furrow back limiting the length of the seed outlets, and means for clamping said shovel back to a seed tube of a seed implement.

4. A shovel back adapted to be secured to a shovel of the lister type, said shovel back having a fan-shaped forwardly and downwardly projecting surface spaced from the rear or under side of the shovel and in intimate contact with the shovel at the forward extremity of said shovel back, the shovel and said shovel back together providing a conduit which is closed at its forward extremity and open only at the two side edges of said shovel back whereby the seed in scattered condition is broadcasted immediately underneath the shovel.

5. A shovel back adapted to be secured to a shovel of the lister type, said shovel back having a forwardly and downwardly inclined surface terminating in a pair of downwardly and laterally inclined surfaces, both of said surfaces being spaced from the rear or under side of the shovel and in intimate contact with the shovel at the forward extremity of said shovel back, the shovel and said shovel back together providing a conduit which is closed at its forward extremity and open only at the two side edges of said shovel back whereby the seed in scattered condition is broadcasted immediately underneath the shovel.

6. In combination with a lister type shovel, a shovel back secured to said shovel, a split collar projecting from said shovel back, a pair of parallel ears projecting outwardly from said collar at the split portion thereof, and means for drawing said ears toward each other with said collar in clamping engagement about the mouth of the seed tube of a seeding implement, said shovel back having a fan-shaped downwardly and forwardly projecting portion spaced except at its forward extremity from the rear or under side of said shovel and having a plurality of apertures between said shovel and said shovel back for broadcasting seed in the newly formed furrow.

WILLIAM ELLIOTT.